US009934108B2

(12) United States Patent
Janakiraman et al.

(10) Patent No.: US 9,934,108 B2
(45) Date of Patent: Apr. 3, 2018

(54) SYSTEM AND METHOD FOR OPTIMIZING MIRROR CREATION

(75) Inventors: Viswesvaran Janakiraman, San Jose, CA (US); Chris Chih-Chen Lin, San Jose, CA (US); Mohankumar R. Tiruvayapadi, Fremont, CA (US)

(73) Assignee: Veritas Technologies LLC, Mountain View, CA (US)

( * ) Notice: Subject to any disclaimer, the term of this patent is extended or adjusted under 35 U.S.C. 154(b) by 198 days.

(21) Appl. No.: 12/913,676

(22) Filed: Oct. 27, 2010

(65) Prior Publication Data

US 2012/0109897 A1 May 3, 2012

(51) Int. Cl.
*G06F 11/14* (2006.01)

(52) U.S. Cl.
CPC .... *G06F 11/1466* (2013.01); *G06F 2201/815* (2013.01)

(58) Field of Classification Search
None
See application file for complete search history.

(56) References Cited

U.S. PATENT DOCUMENTS

| | | | |
|---|---|---|---|
| 7,310,714 B2* | 12/2007 | Kekre et al. | 711/162 |
| 7,493,458 B1* | 2/2009 | Kemeny et al. | 711/161 |
| 2002/0073278 A1* | 6/2002 | McDowell | G06F 11/2082 711/114 |
| 2003/0074492 A1* | 4/2003 | Cochran | 710/5 |
| 2006/0143412 A1* | 6/2006 | Armangau | 711/162 |
| 2007/0234286 A1* | 10/2007 | Huang et al. | 717/114 |
| 2009/0259817 A1* | 10/2009 | Sharma et al. | 711/162 |
| 2010/0077162 A1* | 3/2010 | Kaneko et al. | 711/162 |
| 2010/0077165 A1* | 3/2010 | Lu et al. | 711/162 |
| 2010/0199042 A1* | 8/2010 | Bates et al. | 711/114 |
| 2010/0257331 A1* | 10/2010 | Frank | G06F 9/5077 711/166 |
| 2010/0274380 A1* | 10/2010 | Gray | 700/104 |
| 2010/0299491 A1* | 11/2010 | Ueda | G06F 3/0613 711/162 |
| 2011/0107025 A1* | 5/2011 | Urkude et al. | 711/112 |

* cited by examiner

*Primary Examiner* — Thu Nga Nguyen

(74) *Attorney, Agent, or Firm* — Patent Law Works LLP

(57) ABSTRACT

Embodiments of the present invention are directed to a method and system for optimizing mirror creation. The method includes receiving, within an electronic system, a request for creating a mirror of a portion of a volume and accessing a data structure comprising information about a plurality of regions of the volume. The method further includes determining a plurality of regions comprising non-zeros of the volume based on the data structure and copying only the plurality of regions comprising non-zeros to create the mirror.

20 Claims, 11 Drawing Sheets

_US 9,934,108 B2_

SYSTEM AND METHOD FOR OPTIMIZING MIRROR CREATION

FIELD OF THE INVENTION

Embodiments of the present invention are generally related to digital computer systems and digital storage.

BACKGROUND OF THE INVENTION

As technology advances, data storage is increasingly important and data storage capacities are increasing rapidly. Correspondingly, the size of data storage arrays and their demands for storage have increased rapidly. Ever increasing amounts of data are required to be highly available and protected from corruption or damage that may be caused by any of a variety of factors, such as natural disasters and power failures, etc. As a result, increasingly complex data storage clusters are used to satisfy the demands for data storage and retrieval.

Similarly, virtualization of computers and/or operating systems has become increasingly important to enable server consolidation such that many small physical servers can be replaced by one larger physical server. This results in increased and more efficient utilization of costly hardware resources such as central processing units (CPU), thereby allowing power savings and hardware cost savings.

Virtual environments typically include virtualized computers and/or operating systems known as virtual machines which require access to storage. In one conventional setup, each virtual machine has a storage file allocated to it which acts as storage for the virtual machine. The storage for the storage file can be allocated for the virtual machine "on demand," such as in two megabyte chunks. However, the allocation of storage on demand causes fragmentation as repeated on demand allocations are performed thereby negatively impacting system performance. Conventional solutions thus allocate the storage for each virtual machine on a fixed basis even though a virtual machine may use much less than it is allocated. When a fixed storage file is allocated to a virtual machine, it is filled with zeros representing free space. Although fixed space allocation increases system performance, typical allocations may include 70% unused or free space.

Each of the fixed storage files may be allocated on one or more storage volumes large enough to host the fixed storage files for all the virtual machines running on a physical server. When a single virtual machine has many such fixed storage files, a single large volume may host only the files from that particular virtual machine. Thus, the storage volumes are large in size in general. The storage volume, with the fixed storage files, may need to be copied when the storage volume is migrated from one storage array to another or when adding a mirror volume for offhost backup. Copying the storage volume often can take large amounts of time as the each of the fixed storage files, e.g., terabytes, must be copied, including those portions that are filled with zeros representing free space. Copying the whole storage volume thus involves significant amounts of time and can also negatively impact system performance. Further, conventional systems require the virtual machine be taken offline while the copy operation is performed, resulting in expensive downtime. Therefore, while fixed allocation may increase system performance, it negatively impacts the storage copy function when the virtual machine's storage volume needs to be mirrored.

Thus, a need exists to copy the volume hosting virtual machine files in an efficient manner without requiring the virtual machines to be taken offline.

SUMMARY OF THE INVENTION

Accordingly, embodiments of the present invention provide a system and method for optimizing mirror creation. In one embodiment, mirror creation is optimized by tracking non-zero regions of a storage medium associated with a virtual machine thereby allowing fast mirror creation through copying only the non-zero regions. Performance during read and write operations is also increased via emulating read requests and suppressing write requests for regions comprising zeros. Embodiments of the present invention further allow mirror creation while the storage (e.g., volume) is actively in use by applications (e.g., applications executed by virtual machines).

In one embodiment, the present invention is implemented as a method for optimizing mirror creation associated with a storage volume hosting virtual machine fixed files. The method includes receiving, within an electronic system, a request for creating a mirror of a volume and accessing a data structure (e.g., bitmap) comprising information about a plurality of regions of the volume. The method further includes determining a plurality of regions comprising non-zeros of the volume based on the data structure and copying only the plurality of regions comprising non-zeros to create the mirror. The method may further include updating the data structure based on each write request received. The method can further include determining deallocated space corresponding to a deleted file and writing zeros to a region corresponding to the deleted file. The method can further include detecting a format command and updating the data structure based on the format command.

The updating of the data structure includes receiving a write request, a portion of which corresponds to a region of the volume and determining whether performance of the write request comprises writing a non-zero value to the region. The updating can further include performing the write request for the region when the write request comprises writing the non-zero value to the region and updating a data structure based on writing a non-zero value to the region. In one embodiment, the data structure is a bitmap with each bit corresponding to a respective cluster of a volume.

The method can further include determining whether performance of the write request comprises writing zeros to the region and determining whether a value of the data structure corresponding to the region indicates the region comprises only zeros. When the value of the data structure corresponding to the region indicates the region comprises zeros and the write request involves writing zeros to the region, the write request is emulated. The write request is performed when the indicator of the data structure corresponding to the region indicates the region comprises zeros and the write request comprises writing the non-zero value to the region. The method can also include receiving a read request for a region and determining whether the region comprises zeros based on the data structure. When the region comprises zeros based on the data structure, the read request is emulated. The read request is performed when the region comprises a non-zero value based on the data structure.

In one embodiment, the present invention is implemented as a non-transitory computer readable storage medium having stored thereon, computer executable instructions that, if executed by a computer system cause the computer system to perform a method including receiving, within an electronic system, a request for creating a mirror of a volume and accessing a data structure (e.g., bitmap) comprising information about a plurality of regions of the volume. The method further includes determining a plurality of regions comprising non-zeros of the volume based on the data structure and copying only the plurality of regions comprising non-zeros to create the mirror. The method may further include updating the data structure based on each write request received. The method can further include determining deallocated space corresponding to a deleted file and writing zeros to a region corresponding to the deleted file. The method can further include detecting a format command and updating the data structure based on the format command.

The updating of the data structure includes receiving a write request, a portion of which corresponds to a region of the volume and determining whether performance of the write request comprises writing a non-zero value to the region. The updating can further include performing the write request for the region when the write request comprises writing the non-zero value to the region and updating a data structure based on writing a non-zero value to the region. In one embodiment, the data structure is a bitmap with each bit corresponding to a respective cluster of a volume.

The method can further include determining whether performance of the write request comprises writing zeros to the region and determining whether a value of the data structure corresponding to the region indicates the region comprises only zeros. When the value of the data structure corresponding to the region indicates the region comprises zeros and the write request involves writing zeros to the region, the write request is emulated. The write request is performed when the indicator of the data structure corresponding to the region indicates the region comprises zeros and the write request comprises writing the non-zero value to the region. The method can also include receiving a read request for a region and determining whether the region comprises zeros based on the data structure. When the region comprises zeros based on the data structure, the read request is emulated. The read request is performed when the region comprises a non-zero value based on the data structure.

In yet another embodiment, the present invention is implemented as a storage cluster system comprising a computer system having one or more processors coupled to a computer readable storage media and executing computer readable code which causes the computer system to implement a process including receiving, within an electronic system, a request for creating a mirror of a volume and accessing a data structure (e.g., bitmap) comprising information about a plurality of regions of the volume. The method further includes determining a plurality of regions comprising non-zeros of the volume based on the data structure and copying only the plurality of regions comprising non-zeros to create the mirror. The method may further include updating the data structure based on each write request received. The method can further include determining deallocated space corresponding to a deleted file and writing zeros to a region corresponding to the deleted file. The method can further include detecting a format command and updating the data structure based on the format command.

The updating of the data structure includes receiving a write request, a portion of which corresponds to a region of the volume and determining whether performance of the write request comprises writing a non-zero value to the region. The updating can further include performing the write request for the region when the write request comprises writing the non-zero value to the region and updating a data structure based on writing a non-zero value to the region. In one embodiment, the data structure is a bitmap with each bit corresponding to a respective cluster of a volume.

The method can further include determining whether performance of the write request comprises writing zeros to the region and determining whether a value of the data structure corresponding to the region indicates the region comprises only zeros. When the value of the data structure corresponding to the region indicates the region comprises zeros and the write request involves writing zeros to the region, the write request is emulated. The write request is performed when the indicator of the data structure corresponding to the region indicates the region comprises zeros and the write request comprises writing the non-zero value to the region. The method can also include receiving a read request for a region and determining whether the region comprises zeros based on the data structure. When the region comprises zeros based on the data structure, the read request is emulated. The read request is performed when the region comprises a non-zero value based on the data structure.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
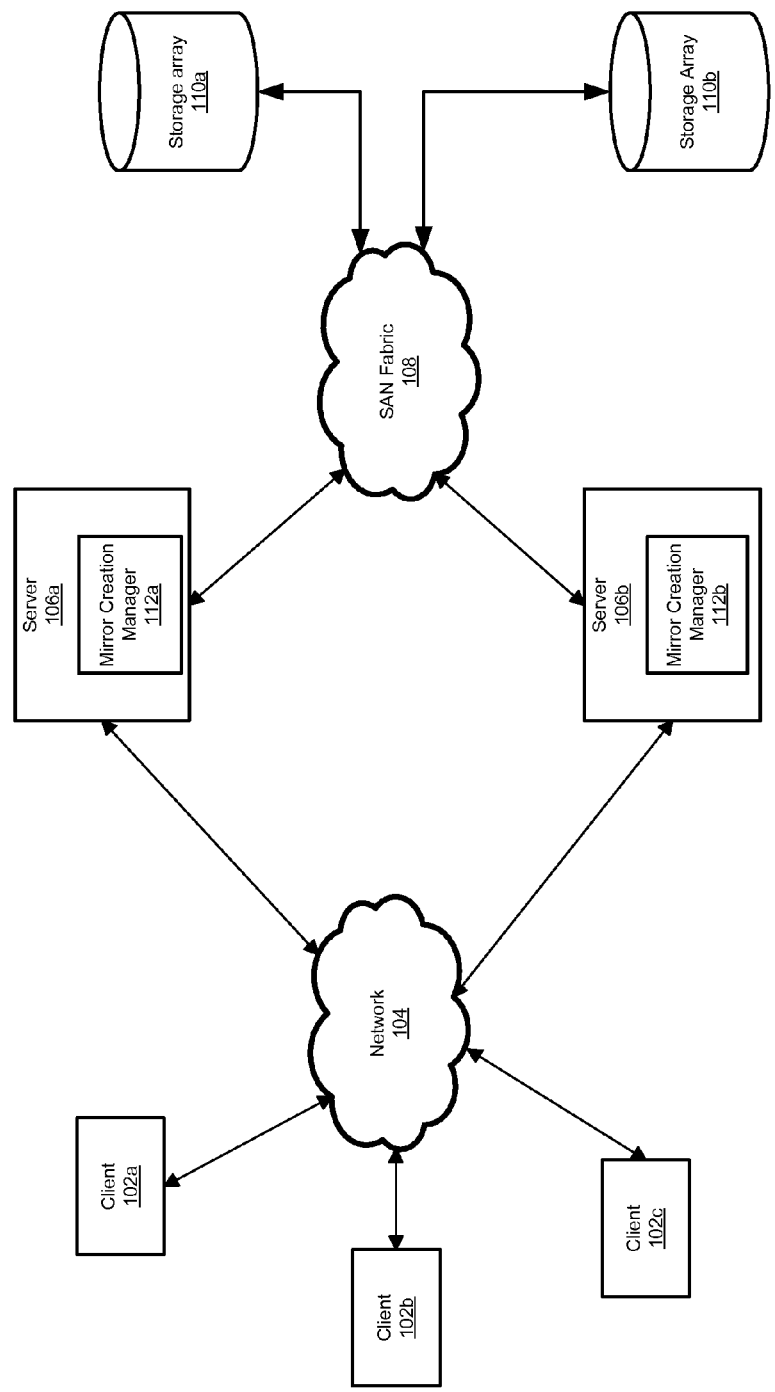
FIG. 1 shows a block diagram of an exemplary operating environment, in accordance with one embodiment of the present invention.

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications, and equivalents, which may be included within the scope of the invention as construed according to the appended Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "deactivating," "disabling," "freezing," "reactivating," "enabling," "thawing," "sending," "determining," "flushing," "responding," "generating," "making," "blocking," "accessing," "taking a snapshot," "associating," "allowing," "updating," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Exemplary Operating Environment

FIG. 1 shows a block diagram of an exemplary operating environment, in accordance with one embodiment of the present invention. Exemplary operating environment 100 includes clients 102a-c, network 104, servers 106a-b, storage area network (SAN) fabric 108, and storage arrays 110a-b. It is appreciated that that components of exemplary operating environment 100 are exemplary and more or fewer components may be present in various configurations. It is appreciated that operating environment may be part of a distributed computing environment, a cloud computing environment, a client server environment, etc.

Client systems 102a-c access information on storage arrays 110a-b via servers 106a-b using, for example, a web browser or other suitable client communication software (not shown). Servers 106a-b perform requests received from clients 102a-c. FIG. 1 depicts the use of a network 104 such as the Internet for exchanging data, but the present disclosure is not limited to the Internet or any particular network-based environment.

Each of servers 106a-b can have multiple clients (e.g., clients 102a-c) connected thereto. Servers 106a-b can provide access to data for various types of applications including, but not limited to, database servers, network file system (NFS) servers, and application servers (e.g., billing). For example, applications and servers might have thousands of people accessing them from different locations, thus the applications and servers need to be highly available and the cluster fault tolerant. Each of data servers 106a-b may communicate with each other over a network (e.g., a redundant private network) (not shown). Servers 106a-b may be linked to storage arrays 110a-b in a variety of ways including, fibre channel.

Servers 106a-b respectively execute mirror creation managers 112a-b which manage data structures for optimizing mirror creation. The data structures are used for tracking regions of storage having non-zero data. The tracking of regions having non-zero data allows copying of only portions of storage (e.g., a volume) while not copying the portions of the storage having zeroes thereby allowing efficient mirror creation. It is appreciated that embodiments of the present invention may track storage regions based on a variety of storage units including, but not limited to, a block, a cluster, a sector, or other storage based unit.

In one embodiment, servers 106a-b execute one or more virtual machines and the one or more virtual machines have virtual machine disk files stored on storage arrays 110a-b. Mirror creation managers 112a-b may be executed by a virtual machine executing on servers 106a-b. In one embodiment, mirror creation managers 112a-b are part of respective volume managers. Embodiments of the present invention advantageously allow copying of virtual machine disk files and volumes while the virtual machines are executing. Embodiments of the present invention further provide both faster read request performance and write request performance through emulation.

Exemplary Systems and Methods for Mirror Creation

Figure 2:
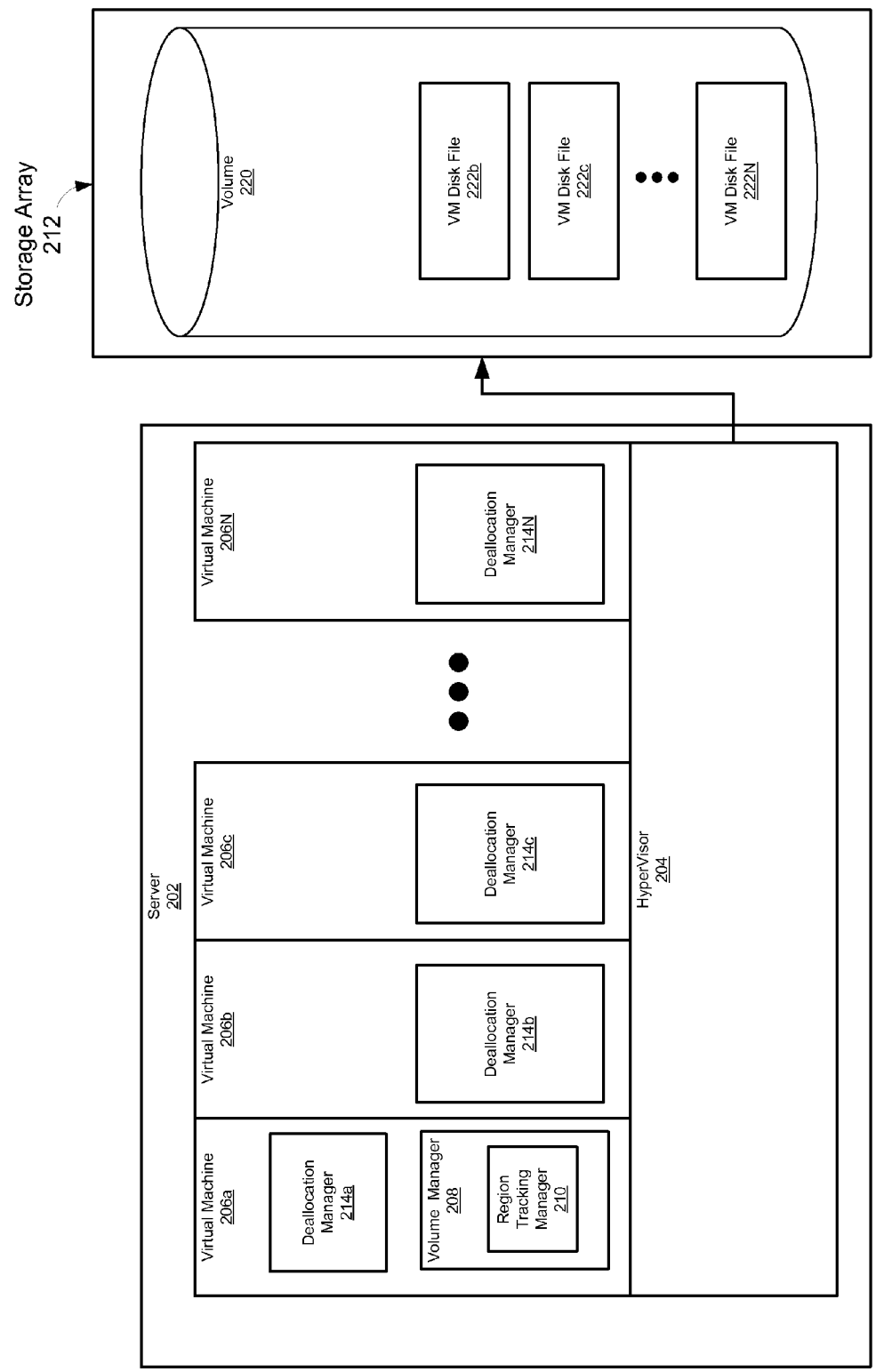
FIG. 2 shows a block diagram of exemplary components of a server and storage array, in accordance with one embodiment of the present invention.

FIG. 2 shows a block diagram of exemplary components of a server and storage array, in accordance with one embodiment of the present invention on which exemplary mirror creation can be implemented. Diagram 200 includes server 202 and storage array 212. Server 202 is operable to receive and process requests (e.g., from clients 102a-c). Storage array 212 is coupled to server 202 (e.g., via SAN fabric 108).

Server 202 is operable to execute a variety of virtualization environments. In one exemplary embodiment, server 202 executes virtual machines 206a-N. Server 202 further executes hypervisor 204 which provides access to resources of server 202. In one embodiment, virtual machine 206a is a root, parent, or service partition which provides services to virtual machines 206b-N and virtual machines 206b-N access hypervisor 204 via virtual machine 206a. In another embodiment, virtual machine 206a may execute on a physical system separate from server 202 and provide access to storage array 212. Storage for virtual machine 206a may be on storage system (not shown) separate from storage array 212.

Storage array 212 includes volume 220 which is used by server 202 to store data. Volume 220 provides storage and thereby a file system (e.g., New Technology File System (NTFS)) for server 202. Volume 220 includes virtual machine (VM) disk files 222b-N which act as virtual hard disks for corresponding virtual machines 206b-N. Each of VM disk files 222b-N may be formatted with a file system for use by virtual machines 206b-N respectively. In one embodiment, VM disk files 222b-N are provisioned and created by hypervisor 204. VM disk files 222b-N may be pre-allocated and zero filled on creation. Allocation of the size of each disk file for each virtual machine is performed, in one example, on a fixed size basis.

Virtual machine 206a includes volume manager 208 which handles input/output (IO) requests from virtual machines 206b-N. Volume manager 208 may allocate volume 220 by allocating space on storage array 212. In one embodiment, volume manager 208 includes region tracking manager 210. Region tracking manager 210 tracks regions of volume 212 that store non-zero data. When VM disk files 222b-N are created or formatted, VM disk files 222b-N filled with zeros and region tracking manger 210 stores information reflecting the locations of volume 220 that are zero filled. Region tracking manager 210 is further operable to detect a format command for volume 220 and reset a data structure for tracking regions of volume 220 to indicate that each region of volume 220 is zero filled.

Virtual machine 206a executes deallocation manager 214a which is operable to determine deallocated regions and write zeros to the deallocated regions of volume 220 corresponding to a deleted VM disk file or regions corresponding to a VM disk file moved during defragmentation. Virtual machines 206b-N execute deallocation managers 214b-N. Deallocation managers 214b-N determine storage space on volume 220 that has been deallocated (e.g., via deletion of files or folders or files or folders moved during defragmentation) and writes zeros to the deallocated space. Deallocation managers 214b-N may write zeros to the deallocated space periodically or upon the performance of a deletion or defragmentation operation in the respective virtual machines. This keeps the amount of data which needs to be copied into a new mirror to the minimum possible size. Deallocation managers 214b-N also detect a format command for any partitions of fixed VM disk files 222b-N and zero fill the regions of the partition before invoking the format command.

Figure 3:
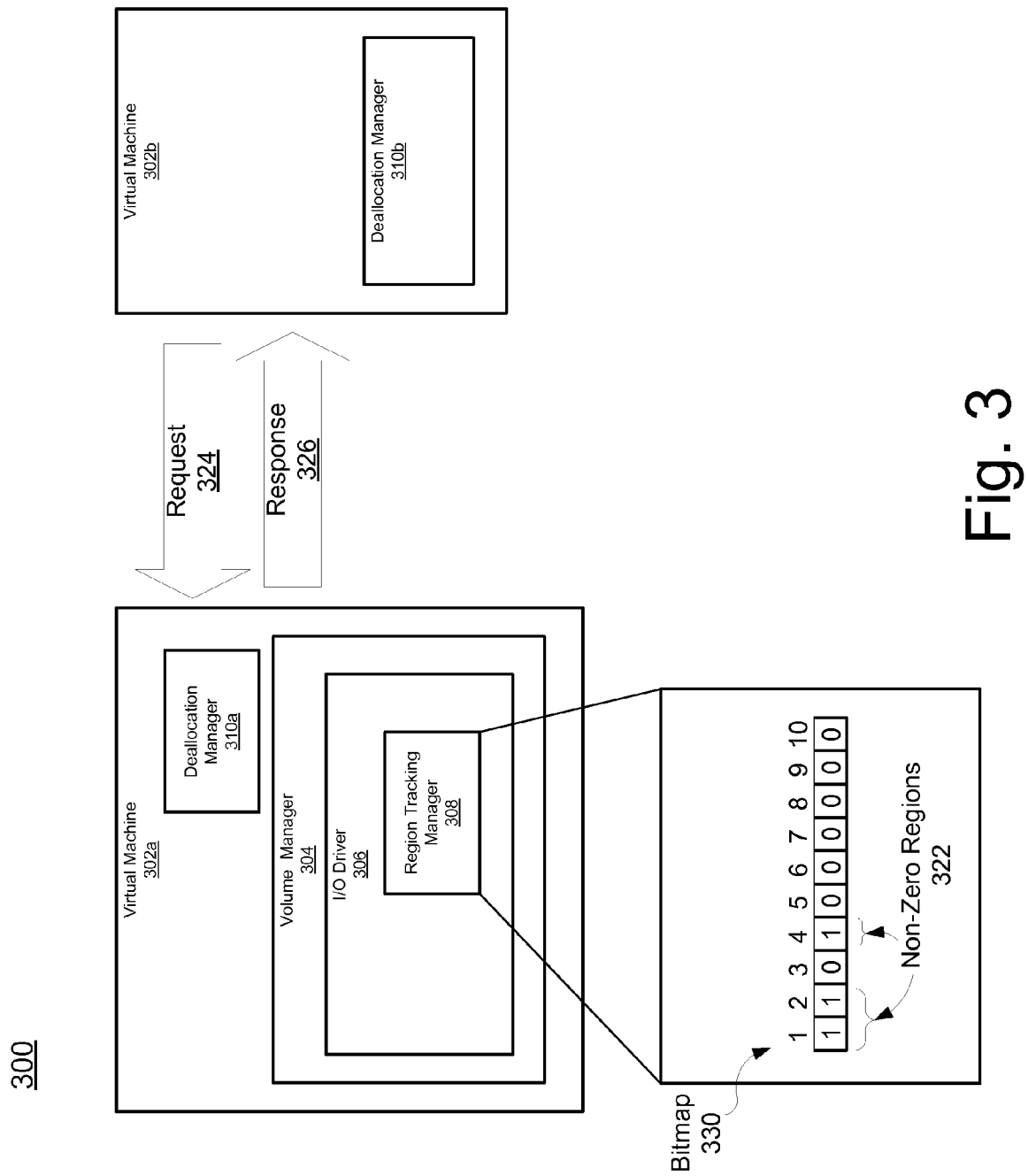
FIG. 3 shows a block diagram of exemplary communication between virtual machines, in accordance with one embodiment of the present invention.

FIG. 3 shows a block diagram of exemplary communications between virtual machines, in accordance with one embodiment of the present invention. Diagram 300 includes virtual machines 302a-b which are communicatively coupled. In one embodiment, virtual machines 302a-b may be executing on a server (e.g., server 202) and have virtual hard disk files on the same volume (e.g., volume 220). Virtual machine 302a may be a service partition and provide services to virtual machine 302b.

Virtual machine 302a includes deallocation manager 310a and volume manager 304 which handles IO operations for virtual machine 302a. Virtual machine 302a receives requests (e.g., request 324) from virtual machine 302b and send responses (e.g., response 326) to virtual machine 302b upon successful completion of the requests.

Volume manager 304 includes IO driver 306 which includes region tracking manager 308. IO driver 306 performs IO operations based on the requests from virtual machine 302a and requests received from other virtual machines received by virtual machine 302a. Region tracking manager 308 includes a data structure for tracking non-zero regions on a storage medium (e.g., volume 220). It is appreciated that a variety of data structures may be used to track non-zero regions on a storage including, but not limited to, a bitmap.

In one exemplary embodiment, region tracking manager 308 advantageously maintains bitmap 330 to track non-zero regions of a volume. Bitmap 330 includes non-zero regions 322 which indicate that the corresponding regions of a volume (e.g., volume 220) comprise non-zero data. For example, if each bit of bitmap 330 corresponds to a cluster of a volume, then non-zero regions 322 indicate that clusters have non-zero data while the other clusters are treated as if they are filled with zeros. Bitmap 330 may be stored in a reserved area of a volume so that the bitmap is automatically copied over during mirror creation.

Bitmap 330 may be a portion of a block level incremental backup (BLIB) bitmap. For example, embodiments of the present invention are operable to use a bitmap having two bits for each region on a volume with one bit corresponding to whether the region has zeros or a non-zero and the other bit corresponding to blocks that have changed since the last incremental backup.

As will be explained further below, bitmap 330 will be used to optimize mirror creation for volume (e.g., volume 220) by allowing the mirror creation procedure to focus on only those portion of the disk file that contain non-zeros. Additionally, the bitmap 330 can also be used to increase system performance for reads that involve zero data. In this case, the system can return all zeros without needing to access the disk. For write operations involving all zeros, again the disk access can be avoided thereby increasing system performance.

Virtual machine 302b may send request 324 which includes a read request to virtual machine 302a. In processing a read request, IO driver 306 communicates with region tracking manager 308. For regions of bitmap 330 that reflect zero regions of the storage, IO driver 306 will advantageously emulate the read request and return zeros without issuing a command to the storage. The emulation of the read request increases system performance as the zero regions of the storage do not have to be accessed from the disk because their values are known. For regions of bitmap 330 that correspond to non-zero regions, IO driver 306 will perform the read operation and fetch data from the volume as would be typical. Response 326 will thus include the data requested by virtual machine 302b.

Virtual machine 302b may send request 324 which includes a write request to virtual machine 302a. In processing the write request, IO driver 306 communicates with region tracking manager 308. IO driver 306 determines which, if any, regions will have zeros written to the regions based on the write request. Based on the regions that would be written with zeros, IO driver 306 advantageously suppresses the writing of the zeros thereby again increasing performance. In handling the portions of the write request that will involve non-zeros to be written to the regions, IO driver 306 performs the writing of the non-zero portions and region tracking manager 308 updates bitmap 330 accordingly. In one embodiment, an override control command may be used to switch off the zero data write filtering (e.g., write suppression) while retaining the zero data emulation (e.g., for a read request) to achieve a zero fill for security purposes.

Request 324 may also include a write request to deallocate space (e.g., to delete a file or move a file during defragmentation). In one exemplary embodiment, a write request to deallocated space is performed via updating the file allocation table. However, the data in the corresponding regions may not be erased. Virtual machine 302b includes deallocation manager 310b which is operable to write zeros in those regions based on determining regions that have been deallocated (e.g., regions corresponding to deletions or files moved during defragmentation). Virtual machine 302a includes deallocation manager 310a which is operable write zeros to regions corresponding to a VM disk file that is deleted (e.g., upon deletion of a virtual machine) or moved during defragmentation. Deallocation managers 310a-b may write zeros to the deallocated regions periodically (e.g., based on a timer) or each time data is deleted or moved during defragmentation. As IO driver 306 receives the requests to write zeros, region tracking manager 308 is signaled and bitmap 330 is updated.

Virtual machine 302b may also send a plurality of write requests, when performing a format command, to virtual machine 302a. IO driver 306 receives performs the write requests, and signals region tracking manager 308. Upon receiving the signal, region tracking manager 308 updates each bit of bitmap 330 to zero indicating that each region of the volume is zero filled. Region tracking manager 308 is operable to detect a format command to format a volume (e.g., volume 220) and signal region tracking manager 308 which resets each bit of bitmap 330.

Figure 4A:
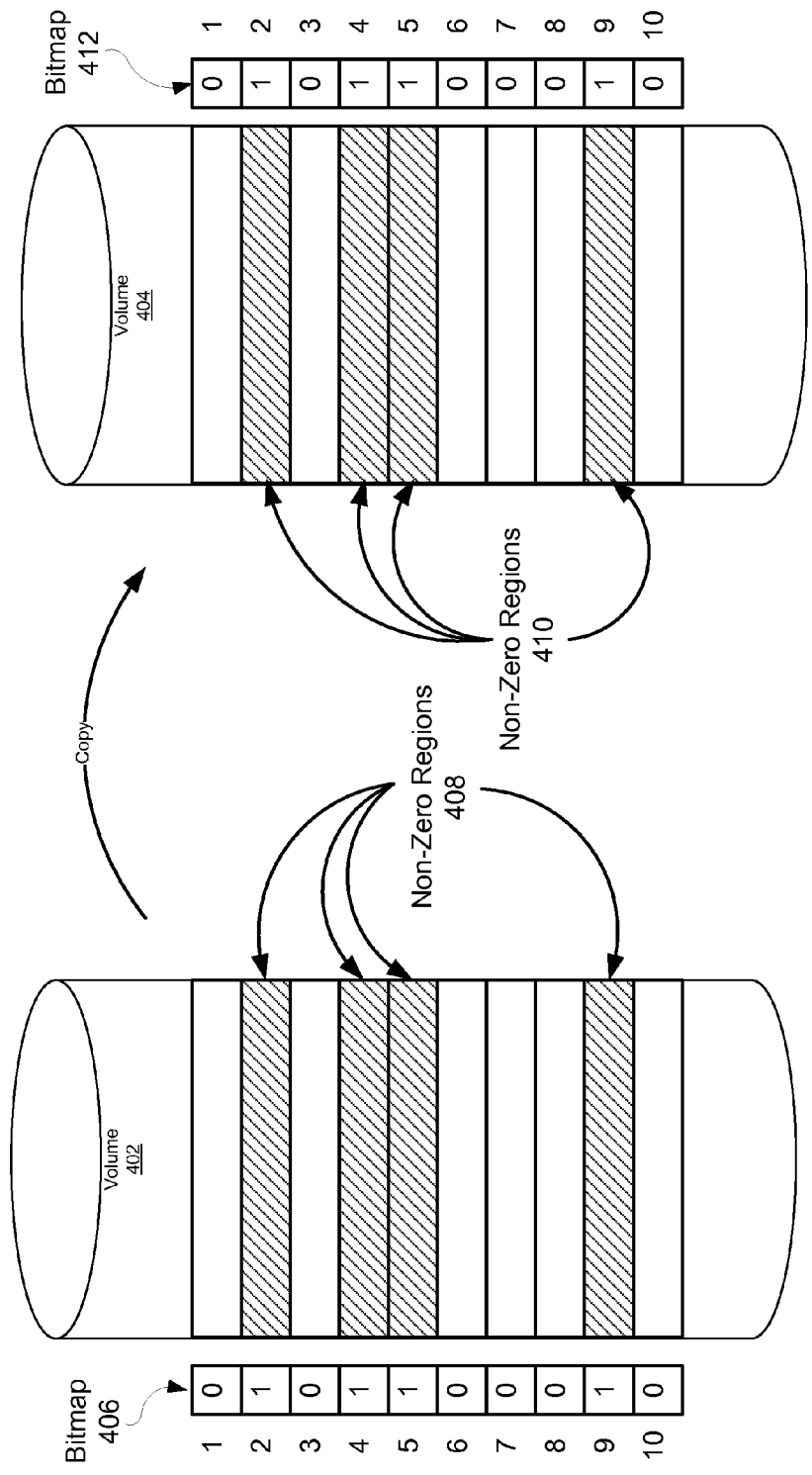
FIG. 4A shows a block diagram of exemplary data structures and volumes during a copy operation, in accordance with an embodiment of the present invention.

FIG. 4A shows a block diagram of exemplary data structures and volumes during a copy operation, in accordance with an embodiment of the present invention. Diagram 400 includes volumes 402-404 and bitmaps 406 and 412. Bitmap 406 indicates which corresponding regions of volume 402 are non-zero regions 408. In making a mirror, e.g., copy, of volume 402 onto volume 404, only non-zero regions 408 of volume 402 are copied to the corresponding regions of volume 404 to create non-zero regions 410. In accordance with embodiments of the present invention, creating a mirror of volume 402 on volume 404 thus involves accessing the bitmap 406 to determine non-zero regions and then only copying the non-zero regions 408. In one embodiment, bitmap 412 is updated as regions of volume 404 are written. In another embodiment, bitmap 402 is stored on volume 402 and thus bitmap 412 is created as volume 402 is copied.

Figure 4B:
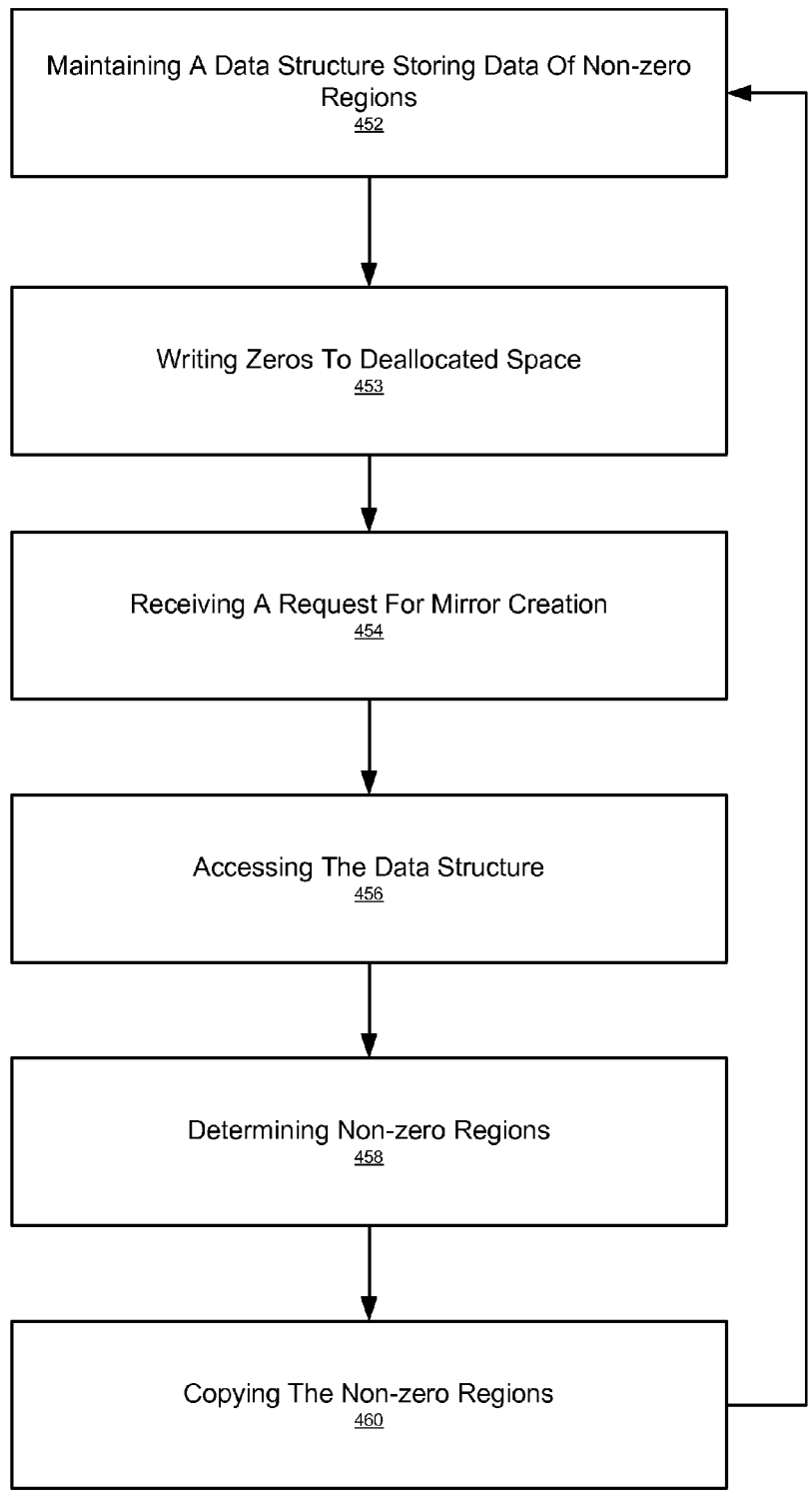
FIG. 4B shows an exemplary flowchart of a computer controlled process for mirror creation, in accordance with embodiments of the present invention.

FIG. 4B shows an exemplary flowchart of a computer controlled process for mirror creation, in accordance with embodiments of the present invention. In one embodiment, process 450 may be executed by a virtual machine (e.g., a virtual machine executing a volume manager).

At block 452, a data structure storing information about a plurality of non-zero regions is maintained. In one embodiment, a bitmap with each bit corresponding to a cluster of a volume is maintained. Each bit indicates whether the corresponding cluster comprises zeros or a non-zero cluster.

At block 453, zeros are written to deallocated space. As described herein, zeros may be written to deallocated space (e.g., of deleted or moved during defragmentation files or VM disk files) and the bitmap is updated to reflect the regions filled with zeros. At block 454, a request for mirror creation is received.

At block 456, the data structure is accessed. At block 458, non-zero regions are determined based on the data structure. As described herein, the data structure is accessed to determine which regions of a volume comprise a non-zero.

At block 460, non-zero regions are copied. In one embodiment, only the non-zero clusters of a volume are copied to create the mirror.

Figure 5:
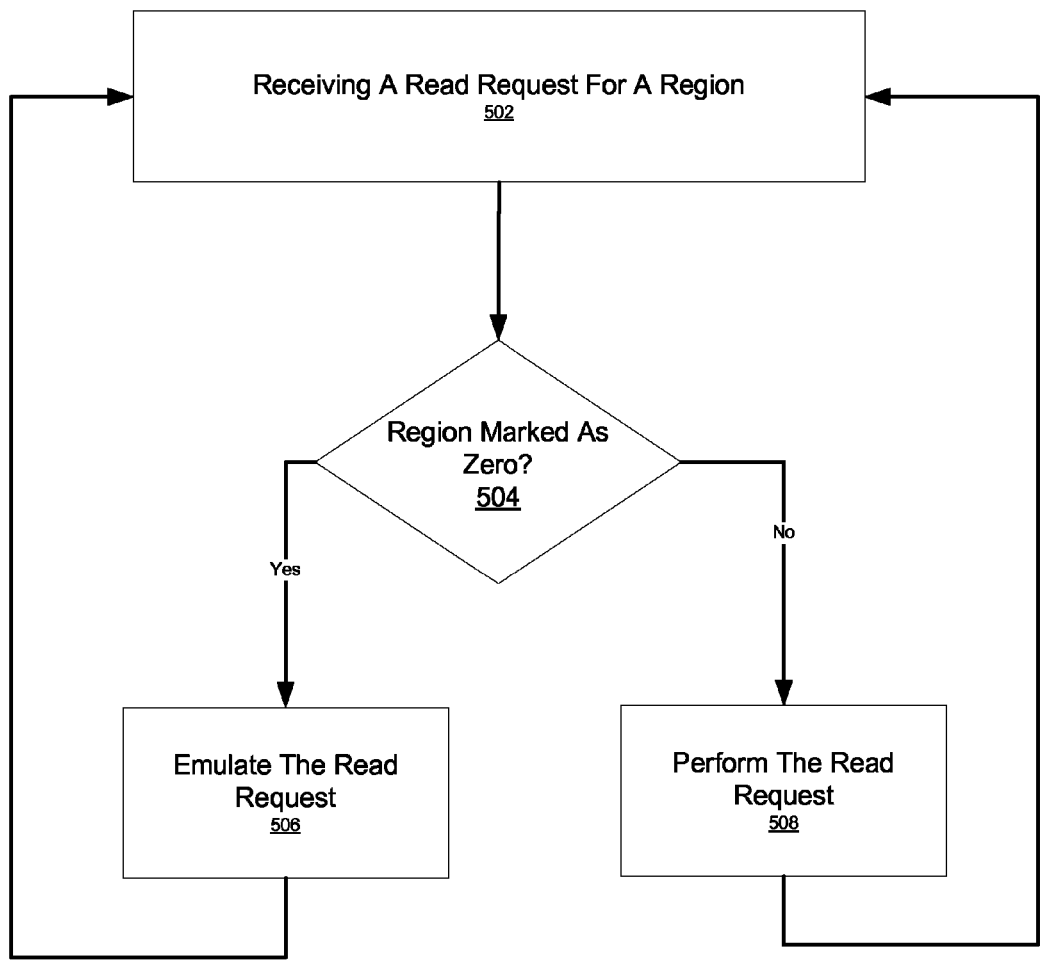
FIG. 5 shows an exemplary flowchart of a computer controlled process for processing a read request, in accordance with embodiments of the present invention.
Figure 6:
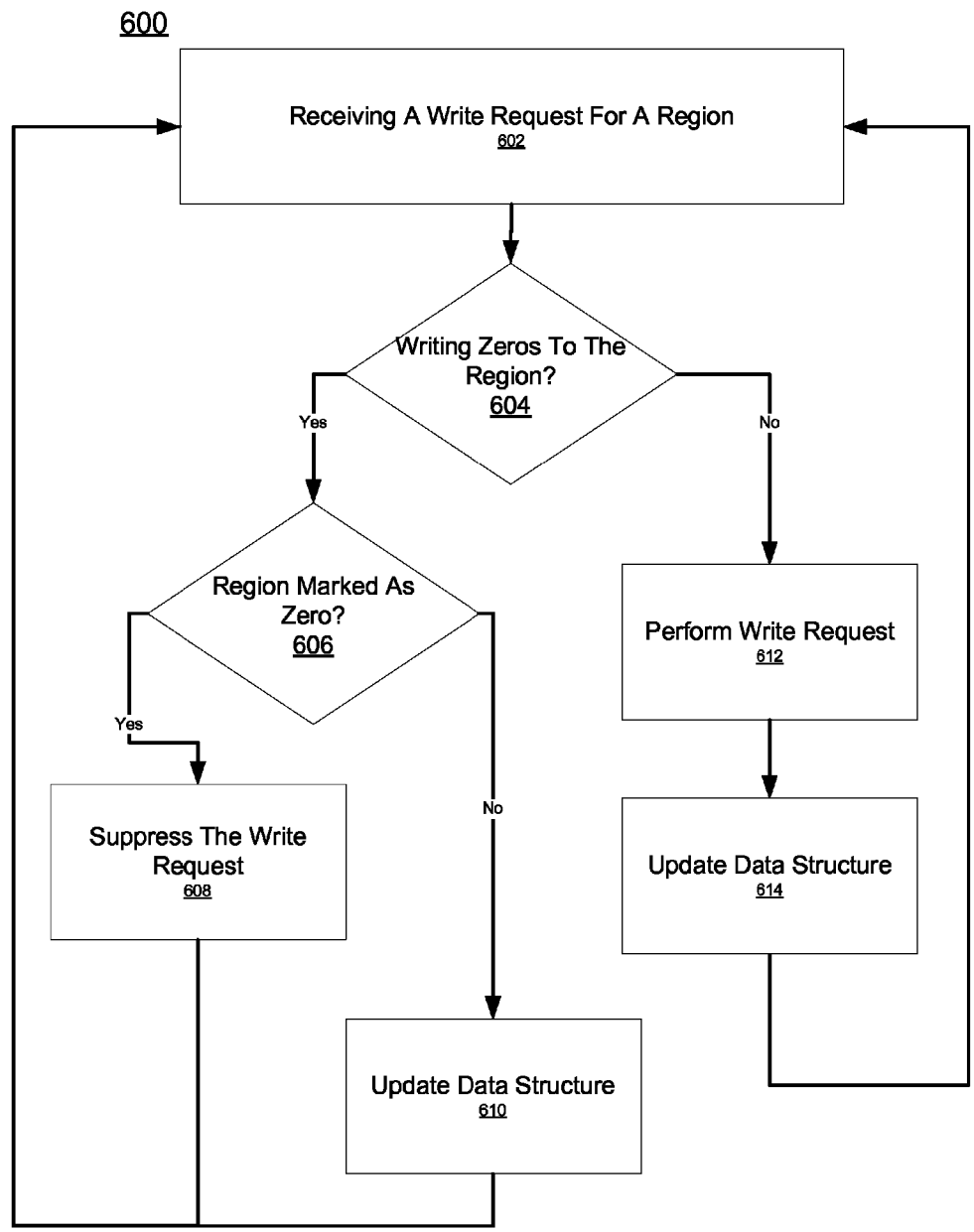
FIG. 6 shows an exemplary flowchart of a computer controlled process for processing a write request, in accordance with embodiments of the present invention.

With reference to FIGS. 5-7, exemplary flowcharts 500-750 illustrates example computer controlled processes used by various embodiments of the present invention. Although specific blocks are disclosed in flowcharts 500-750, such blocks are exemplary. That is, embodiments are well suited to performing various other blocks or variations of the blocks recited in flowcharts 500-750. It is appreciated that the blocks in flowcharts 500-750 may be performed in an order different than presented, and that not all of the blocks in flowcharts 500-750 may be performed. Flowcharts 500-750 include processes that, in various embodiments, are carried out by a processor under the control of computer-readable and computer-executable instructions. Embodiments of the present invention may thus be stored as computer readable media or computer-executable instructions including, but not limited to, a firmware update, software update package, or hardware (e.g., ROM).

FIG. 5 shows an exemplary flowchart of a process for processing a read request, in accordance with embodiments of the present invention. In one embodiment, process 500 may be executed by a virtual machine acting as a service partition.

At block 502, a read request is received for a region. As described herein, the read request may be received from a virtual machine.

At block 504, a determination is made whether the region is marked as comprising zeros. As described herein, whether the region comprises zeros is determined based on accessing a corresponding bitmap data structure comprising information indicating zero and non-zero regions of a volume. If the region comprises zeros, block 506 is performed. If the region comprises a non-zero, block 508 is performed.

At block 506, the read request is emulated. As described herein, the read request may be emulated without performing a disk access such that zeros are returned for a region comprising zeros based on the data structure. It is appreciated that emulating the read request improves performance as the storage is not accessed.

At block 508, the read request is performed (e.g., for non-zero regions) by accessing the disk to obtain the data.

FIG. 6 shows an exemplary flowchart of a process for processing a write request, in accordance with embodiments of the present invention. In one embodiment, process 600 may be executed by a virtual machine acting as a service partition.

At block 602, a write request is received for a region. As described herein, the write request may be received from a virtual machine.

At block 604, a determination is made whether the write request comprises writing zero to the region. In one embodiment, the data of the write request is examined based on the region size to determine if performance of the write request comprises writing zeros to the region. If the write request comprises writing zeros to the region, block 606 is performed. If the write request comprises writing a non-zero to the region, block 612 is performed.

At block 606, whether the region is marked as comprising zeros is determined. As described herein, a region can be determined to comprise zeros based on an associated bitmap data structure comprising information indicating zero and non-zero regions. If the region is marked as comprising zeros, block 608 is performed. If the region is marked as comprising a non-zero, block 610 is performed.

At block 608, the write request is suppressed. As described herein, the write request may be suppressed such the write request is reported as completed without accessing the storage based on the data structure (e.g., a w write request for writing zeros to a zero region). It is appreciated that suppressing the write request improves performance as the storage is not accessed. At block 610, the data structure is updated to indicate the region as having zeros.

Likewise, at block 612, the write request is performed. As described herein, when the write request comprises writing a non-zero to the region the write request is performed.

At block 614, the data structure is updated for the region involved. As described herein, the data structure may be updated to reflect that a non-zero has been written to the region.

Figure 7A:
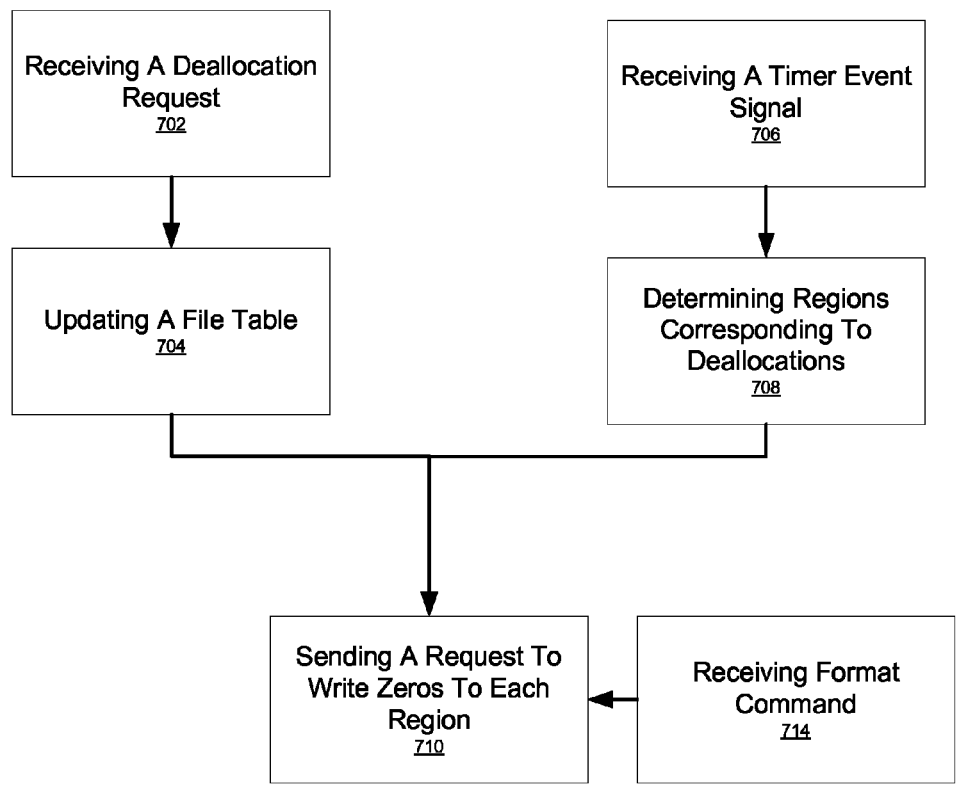
FIG. 7A shows an exemplary flowchart of a computer controlled process for processing a deallocation command and a format command on a virtual machine, in accordance with embodiments of the present invention.

FIG. 7A shows an exemplary flowchart of a process for processing a deallocation command and a format command on a virtual machine, in accordance with embodiments of the present invention.

At block 702, a deallocation request is received. As described herein, the deallocation request may be received within a virtual machine and comprise deletion of a file in a virtual hard disk file or moving a file in a virtual hard disk file during defragmentation.

At block 704, a file table is updated. In one embodiment, a file allocation table corresponding to a virtual hard disk file is updated to reflect deallocation of space of the virtual hard disk file.

At block 706, a timer event signal is received. In one embodiment, a timer event signal may periodically trigger writing zeros to deallocated portions of a virtual hard disk file. The timer may execute as part of a virtual machine.

At block 708, regions corresponding to deallocated files are determined. Regions may be determined based on accessing a file allocation table of a virtual hard disk file or accessing metadata of the file system of the virtual hard disk file.

At block 710, a request to write zeros to each region corresponding to the deallocated file is sent. In one embodiment, a request to write zeros to each region is sent upon deletion of a file or moving of a file during defragmentation. In another embodiment, a request to write zeros to deallocated regions is sent periodically (e.g., based on a timer).

At block 714, a format command is received. The format command may correspond to a command for formatting a virtual hard disk or a partition thereof. The file system for the partition or the virtual hard disk may be detected. If the file system for the virtual hard disk will write zeros to each region in performing the format command, a data structure tracking non-zero regions may be updated as zeros are written to the regions. Where the file system for the virtual hard disk will not write zeroes in performing the format, block 710 may then be performed before the format command is executed.

Figure 7B:
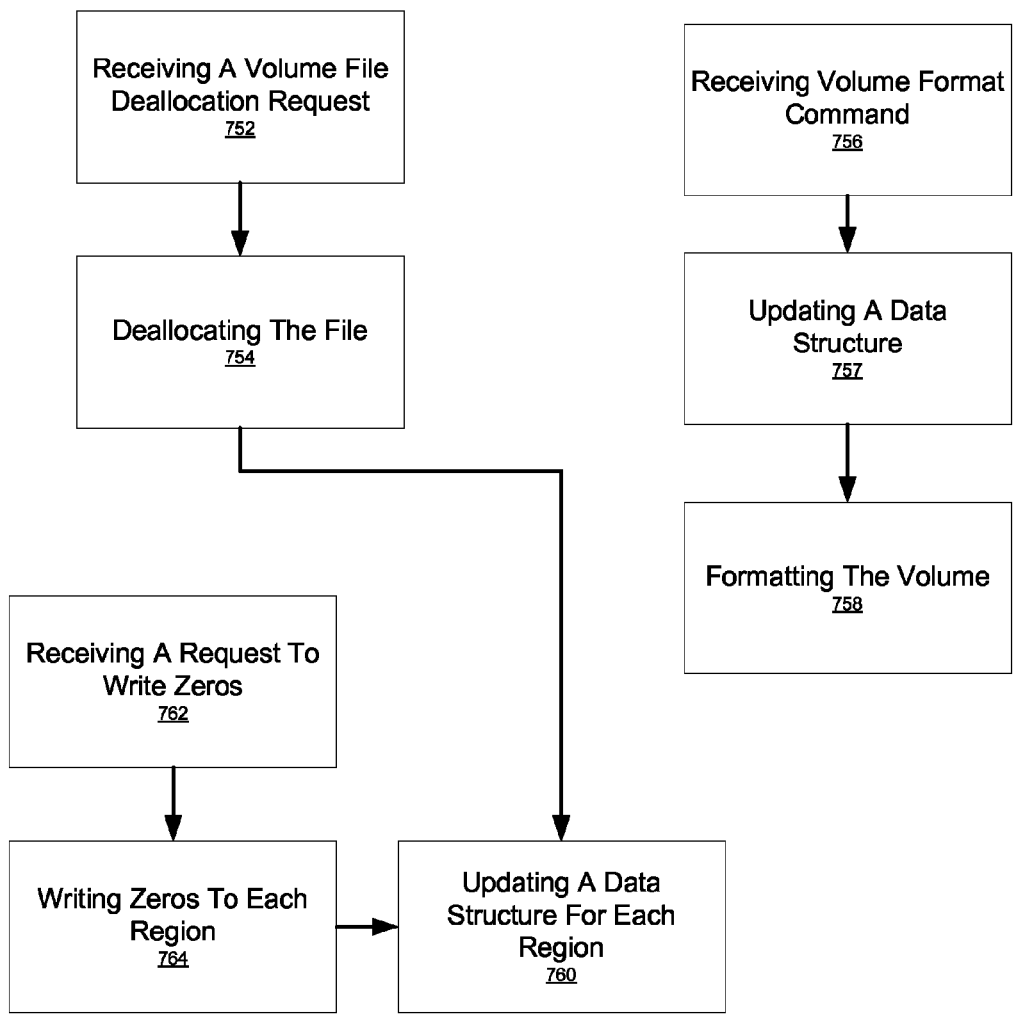
FIG. 7B shows an exemplary flowchart of a computer controlled process for processing deallocation and format requests for a volume, in accordance with embodiments of the present invention.

FIG. 7B shows an exemplary flowchart of a computer controlled process for processing deallocation and format requests for a volume, in accordance with embodiments of the present invention. Process 750 may be executed by a virtual machine that is a service partition.

At block 752, a volume file deallocation request is received. As described herein, an IO driver may receive a request to delete a file (e.g., a virtual machine disk file) from a volume (e.g., volume 220) or move a file during defragmentation. At block 754, the file is deallocated (e.g., from volume 220).

At block 756, a volume format command is received. As described herein, an IO driver may receive a command to format a volume (e.g., volume 220).

At block 757, a data structure (e.g., bitmap) is updated. In one embodiment, the data structure is reset to indicate that each region is zero filled.

At block 758, the volume is formatted thereby erasing each VM disk file on the volume.

At block 762, a request to write zeros is received. As described herein, the request to write zeros to regions may be received from a virtual machine.

At block 764, zeros are written to each region. As described herein, zeros may be written to each region corresponding to deallocated space.

At block 760, a data structure is updated for each region. As described herein, embodiments of the present invention are operable to update a data structure based on write requests to write zeros to each region (e.g., for file or folder deletion, VM disk file deletion, defragmentation, VM disk file formatting, or volume formatting).

Figure 8:
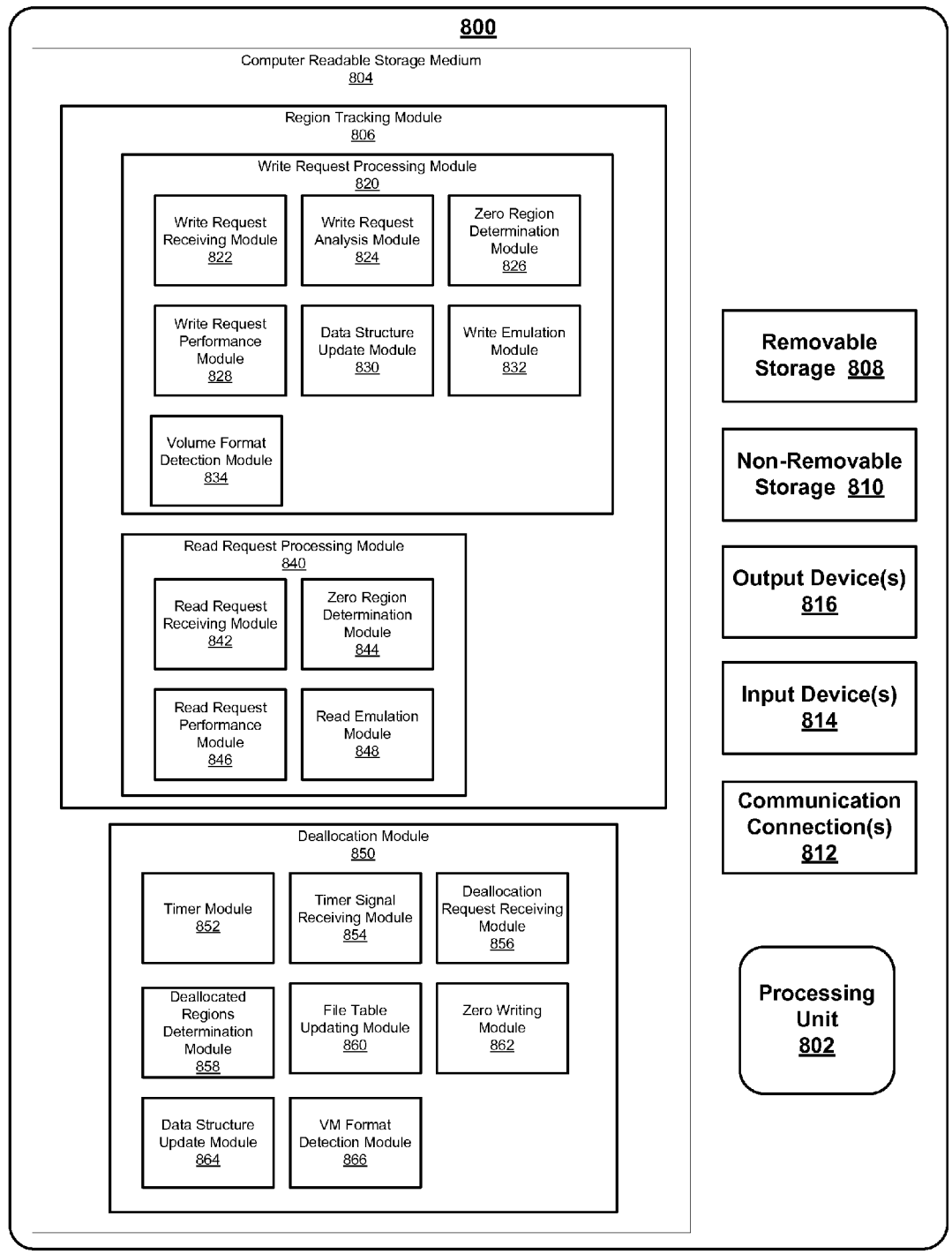
FIG. 8 shows a block diagram of exemplary computer system and corresponding modules, in accordance with one embodiment of the present invention.

FIG. 8 illustrates example components used by various embodiments of the present invention. Although specific components are disclosed in system 800, it should be appreciated that such components are examples. That is, embodiments of the present invention are well suited to having various other components or variations of the components recited in system 800. It is appreciated that the components in system 800 may operate with other components than those presented, and that not all of the components of system 800 may be required to achieve the goals of system 800.

FIG. 8 shows a block diagram of an exemplary computer system and corresponding modules, in accordance with one embodiment of the present invention. With reference to FIG. 8, an exemplary system module for implementing embodiments includes a general purpose computing system environment, such as computing system environment 800. Computing system environment 800 may include, but is not limited to, servers (e.g., servers 106*a-b*), desktop computers, laptops, tablet PCs, mobile devices, and smartphones. In its most basic configuration, computing system environment 800 typically includes at least one processing unit 802 and computer readable storage medium 804. Depending on the exact configuration and type of computing system environment, computer readable storage medium 804 may be volatile (such as RAM), non-volatile (such as ROM, flash memory, etc.) or some combination of the two. Portions of computer readable storage medium 804 when executed optimize mirror creation (e.g., processes 500-750). In one embodiment, computer readable storage medium 804 is a non-transitory computer readable medium.

Additionally, computing system environment 800 may also have additional features/functionality. For example, computing system environment 800 may also include additional storage (removable and/or non-removable) including, but not limited to, magnetic or optical disks or tape. Such additional storage is illustrated in FIG. 8 by removable storage 808 and non-removable storage 810. Computer storage media includes volatile and nonvolatile, removable and non-removable media implemented in any method or technology for storage of information such as computer readable instructions, data structures, program modules or other data. Computer readable medium 804, removable storage 808 and nonremovable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 800. Any such computer storage media may be part of computing system environment 800.

Computing system environment 800 may also contain communications connection(s) 812 that allow it to communicate with other devices. Communications connection(s) 812 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 812 may allow computing system environment 800 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 812 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 800 may also have input device(s) 814 such as a keyboard, mouse, pen, voice input device, touch input device, remote control, etc. Output device(s) 816 such as a display, speakers, etc. may also be included. All these devices are well known in the art and are not discussed at length.

In one embodiment, computer readable storage medium 804 includes deallocation module 850 and region tracking module 806 which includes write request processing module 820 and read request processing module 840.

Write request processing module 820 includes write request receiving module 822, write request analysis module 824, zero region determination module 826, write request performance module 828, data structure update module 830, write emulation module 832, and volume format detection module 834. Write request receiving module 822 is operable to receive a write request (e.g., from a virtual machine). Write request analysis module 824 is operable to determine whether performance of a write request comprises writing zeros or a non-zero to a region. Zero region determination module 826 is operable to determine whether a region comprise zeros or a non-zero based on accessing a data structure (e.g., bitmap 330). Write performance request module 828 is operable to perform a write request (e.g., when the write request comprises writing a non-zero to a region). Data structure update module 830 is operable to update a data structure (e.g., bitmap 330) based on the writing of a non-zero to a region. Write emulation module 832 is operable to emulate a write request (e.g., when a write request comprises writing zeros to a region and a data structure indicates that the region comprises zeros). Volume format detection module 834 is operable to detect a format command for the volume and signal data structure update module 830 to reset the data structure (e.g., bitmap).

Read request processing module 840 includes read request receiving module 842, zero region determination module 844, read request performance module 846, and read emulation module 848. Read request receiving module 842 is operable to receive a read request (e.g., from a virtual machine). Read request performance module 846 is operable to perform a read request (e.g., when the read request comprises reading a non-zero region). Zero region determination module 844 is operable to determine whether a region comprises zeros based on accessing a data structure (e.g., bitmap 330). Read emulation module 848 is operable to emulate a read request (e.g., where a read request corresponds to a zero filled region based on a data structure operable to track zero and non-zero regions of a storage medium).

Deallocation module 850 includes timer module 852, timer signal receiving module 854, deallocation request receiving module 856, deallocated regions determination module 858, file table updating module 860, zero writing module 862, data structure update module 864, and virtual machine (VM) format detection module 866. Timer module 852 is operable to send a timer signal after a predetermined amount of time (e.g., periodically). Timer signal receiving module 854 is operable to receive a timer signal from timer module 852 and provides the signal to deallocated regions determination module 858. Deallocated regions determination module 858 is operable to determine regions on a storage medium that correspond to deleted or moved during defragmentation files, folders, or VM disk files and deallocated space. Deallocated region determination module 858 is operable to signal zero writing module 862 after determining regions corresponding to deallocated space. Deallocation request receiving module 856 is operable to receive a request to delete data on a storage medium (e.g., files, folders, VM disk file, etc.) or move data (e.g., during defragmentation) and signal zero writing module 862. VM format detection module 866 is operable to receive a format command (e.g., to format a virtual machine disk file or to format a partition) and signal zero writing module 862 when a file system for a virtual hard disk (or partition thereof) will not write zeros to each region in performing a format command.

Zero writing module 862 is operable to write zeros to regions of a storage medium (e.g., deallocated regions or regions to be formatted) and portions of a virtual machine hard disk file. Zero writing module 862 is further operable to signal data structure update module 864 upon writing zeros to each region. Data structure update module 864 is operable to update a data structure storing data corresponding to zero and non-zero regions of a storage medium.

Figure 9:
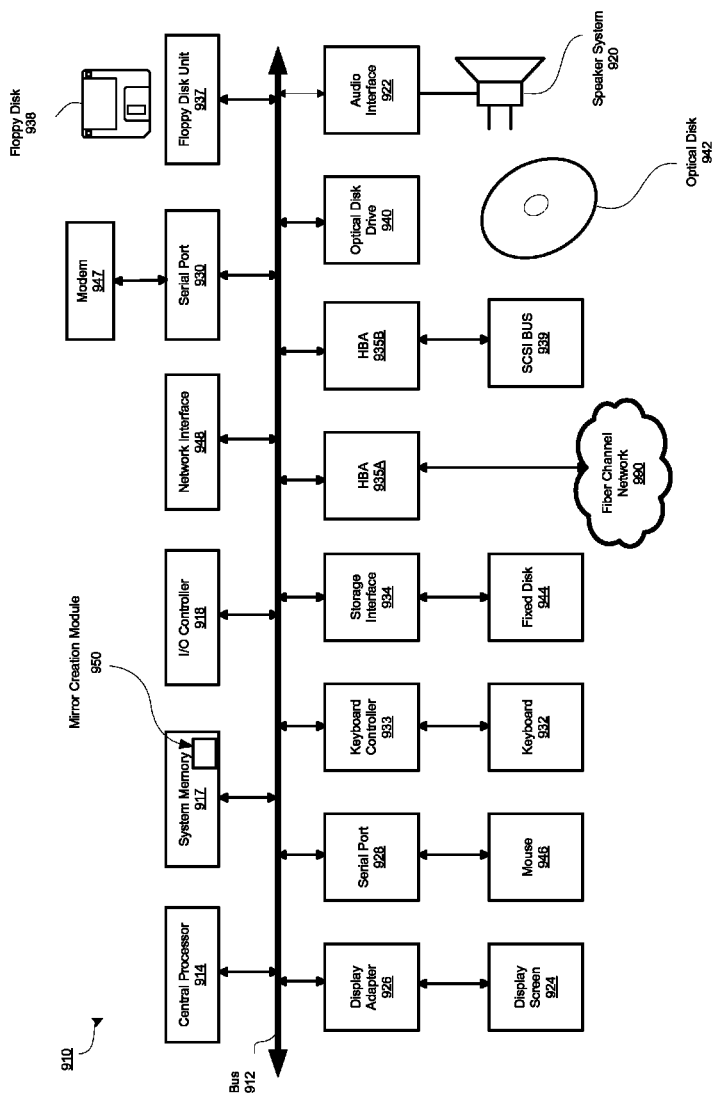
FIG. 9 shows a block diagram of another exemplary computer system, in accordance with one embodiment of the present invention.

FIG. 9 shows a block diagram of another exemplary computer system, in accordance with one embodiment of the present invention. FIG. 9 depicts a block diagram of a computer system 910 suitable for implementing the present disclosure. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912). System memory 917 includes mirror creation module 950 which is operable to track non-zero regions of a volume and write zeros to deallocated space of the volume.

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 910 are generally stored on and accessed via a computer readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present disclosure. The devices and subsystems can be interconnected in different ways from that shown in FIG. 9. The operation of a computer system such as that shown in FIG. 9 is readily known in the art and is not discussed in detail in this application. Code to implement the present disclosure can be stored in computer-readable storage media such as one or more of system memory 917, fixed disk 944, optical disk 942, or floppy disk 938. The operating system provided on computer system 910 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Thus, embodiments of the present invention provide a system and method for optimizing mirror creation. In one embodiment, mirror creation is optimized by tracking non-zero regions of a storage medium associated with a virtual machine thereby allowing fast mirror creation though copying only the non-zero regions. Performance during read and write operations is also increased via emulating read requests and suppressing write requests for regions comprising zeros. Embodiments of the present invention further allow mirror creation while the storage (e.g., volume) is actively in use by applications (e.g., applications executed by virtual machines).

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for optimizing mirror creation comprising:
creating a first bitmap comprising a plurality of first bits corresponding to a plurality of regions of an original volume associated with a virtual machine, each first bit indicating whether storage is being used on a corresponding region of said plurality of regions of said original volume;
determining deallocated space within said original volume;
writing zeros to a region corresponding to said deallocated space within said original volume;
receiving, within an electronic system, a request for creating a mirror of said original volume;
accessing said first bitmap to determine whether storage is being used on a corresponding region of said plurality of regions;
identifying storage being used on said corresponding region of said original volume based at least in part on said first bitmap;
creating said mirror of said original volume associated with said virtual machine by copying only said identified storage being used to a destination volume; and
creating a second bitmap at said destination volume, said second bitmap comprising a plurality of second bits corresponding to a plurality of regions of said destination volume where said identified storage being used is copied, each second bit indicating whether storage is being used on a corresponding region of said plurality of regions of said destination volume.

2. The method of claim 1 further comprising:
updating said first bitmap based on each write request received.

3. The method of claim 2 wherein said updating further comprises:
receiving a write request wherein a portion of said write request corresponds to a region of said volume;
determining whether performance of said write request comprises writing a non-zero value to said region;
performing said write request for said region provided said write request comprises writing said non-zero value to said region; and
updating said first bitmap based on writing said non-zero value to said region.

4. The method of claim 3 further comprising:
determining whether performance of said write request comprises writing zeros to said region;
determining whether a value of said first bitmap corresponding to said region indicates said region comprises only zeros; and
emulating said write request when said value of said first bitmap corresponding to said region indicates said region comprises zeros and said write request involves writing zeros to said region.

5. The method of claim 4 further comprising:
performing said write request when said indicator of said first bitmap corresponding to said region indicates said region comprises zeros and said write request comprises writing said non-zero value to said region.

6. The method of claim 2 further comprising:
receiving a read request for a region; and
determining whether said region comprises zeros based on said first bitmap.

7. The method of claim 6 further comprising:
emulating said read request when said region comprises zeros based on said first bitmap.

8. The method of claim 1 further comprising:
determining that said deallocated space corresponds to a deleted file; and
writing zeros to a region corresponding to said deleted file.

9. The method of claim 1 further comprising:
detecting a format command; and
updating said first bitmap based on said format command.

10. A non-transitory computer readable storage medium having stored thereon computer executable instructions that, if executed by a computer system, cause the computer system to perform a method for optimizing mirror creation comprising:
creating a first bitmap comprising a plurality of first bits corresponding to a plurality of regions of an original volume associated with a virtual machine, each first bit indicating whether storage is being used on a corresponding region of said plurality of regions of said original volume;
determining deallocated space within said original volume;
writing zeros to a region corresponding to said deallocated space within said original volume;
receiving, within an electronic system, a request for creating a mirror of a portion of said original volume;
accessing said first bitmap to determine whether storage is being used on a corresponding region of said plurality of regions;
identifying storage being used on said corresponding region of said original volume based at least in part on said first bitmap;
creating said mirror of said original volume associated with said virtual machine by copying only said identified storage being used to a destination volume; and
creating a second bitmap at said destination volume, said second bitmap comprising a plurality of second bits corresponding to a plurality of regions of said destination volume where said identified storage being used is copied, each second bit indicating whether storage is being used on a corresponding region of said plurality of regions of said destination volume.

11. The computer readable storage medium of claim 10, wherein said method further comprises:
maintaining said first bitmap based on each read request and each write request received.

12. The computer readable storage medium of claim 11, wherein said maintaining further comprises:
  receiving a write request wherein a portion of said write request corresponds to a region of said volume;
  determining whether performance of said write request comprises writing a non-zero value to said region;
  performing said write request for said region when said write request comprises writing said non-zero value to said region; and
  updating said first bitmap based on writing said non-zero value to said region.

13. The computer readable storage medium of claim 12, wherein said maintaining further comprises:
  determining whether performance of said write request comprises writing zeros to said region; and
  determining whether a value of said first bitmap corresponding to said region indicates said region comprises zeros; and
  emulating said write request when said value of said first bitmap corresponding to said region indicates said region comprises zeros and said write request involves writing zeros to said region.

14. The computer readable storage medium of claim 13, wherein said maintaining further comprises:
  performing said write request when said indicator of said first bitmap corresponding to said region indicates said region comprises zeros and said write request comprises writing said non-zero value to said region.

15. The computer readable storage medium of claim 11, wherein said maintaining further comprises:
  receiving a read request for said region; and
  determining whether said region comprises zeros based on said first bitmap.

16. The computer readable storage medium of claim 15, wherein said maintaining further comprises:
  emulating said read request when said region comprises zeros based on said first bitmap.

17. The computer readable storage medium of claim 15, wherein said method further comprises:
  determining that said deallocated space corresponds to a deleted file; and
  writing zeros to a region corresponding to said deleted file.

18. A storage access system, comprising:
  a computer system comprising one or more processors coupled to a computer readable storage medium and configurable to execute computer readable code stored on the computer readable storage medium which causes the computer system to implement a method comprising:
    creating a first bitmap comprising a plurality of first bits corresponding to a plurality of regions of an original volume associated with a virtual machine, each first bit indicating whether storage is being used on a corresponding region of said plurality of regions of said original volume;
    determining deallocated space within said original volume;
    writing zeros to a region corresponding to said deallocated space within said original volume;
    receiving, within an electronic system, a request for creating a mirror of a portion of said original volume;
    accessing said first bitmap to determine whether storage is being used on a corresponding region of said plurality of regions;
    identifying storage being used on said corresponding region of said original volume based at least in part on said first bitmap;
    creating said mirror of said original volume associated with said virtual machine by copying only said identified storage being used to a destination volume; and
    creating a second bitmap at said destination volume, said second bitmap comprising a plurality of second bits corresponding to a plurality of regions of said destination volume where said identified storage being used is copied, each second bit indicating whether storage is being used on a corresponding region of said plurality of regions of said destination volume.

19. The storage access system of claim 18, wherein said method further comprises:
  determining that said deallocated space corresponds to a deleted file; and
  writing zeros to a region corresponding to said deleted file.

20. The storage access system of claim 18, wherein said method further comprises:
  detecting a format command; and
  updating said first bitmap based on said format command.

* * * * *